Patented Nov. 12, 1929

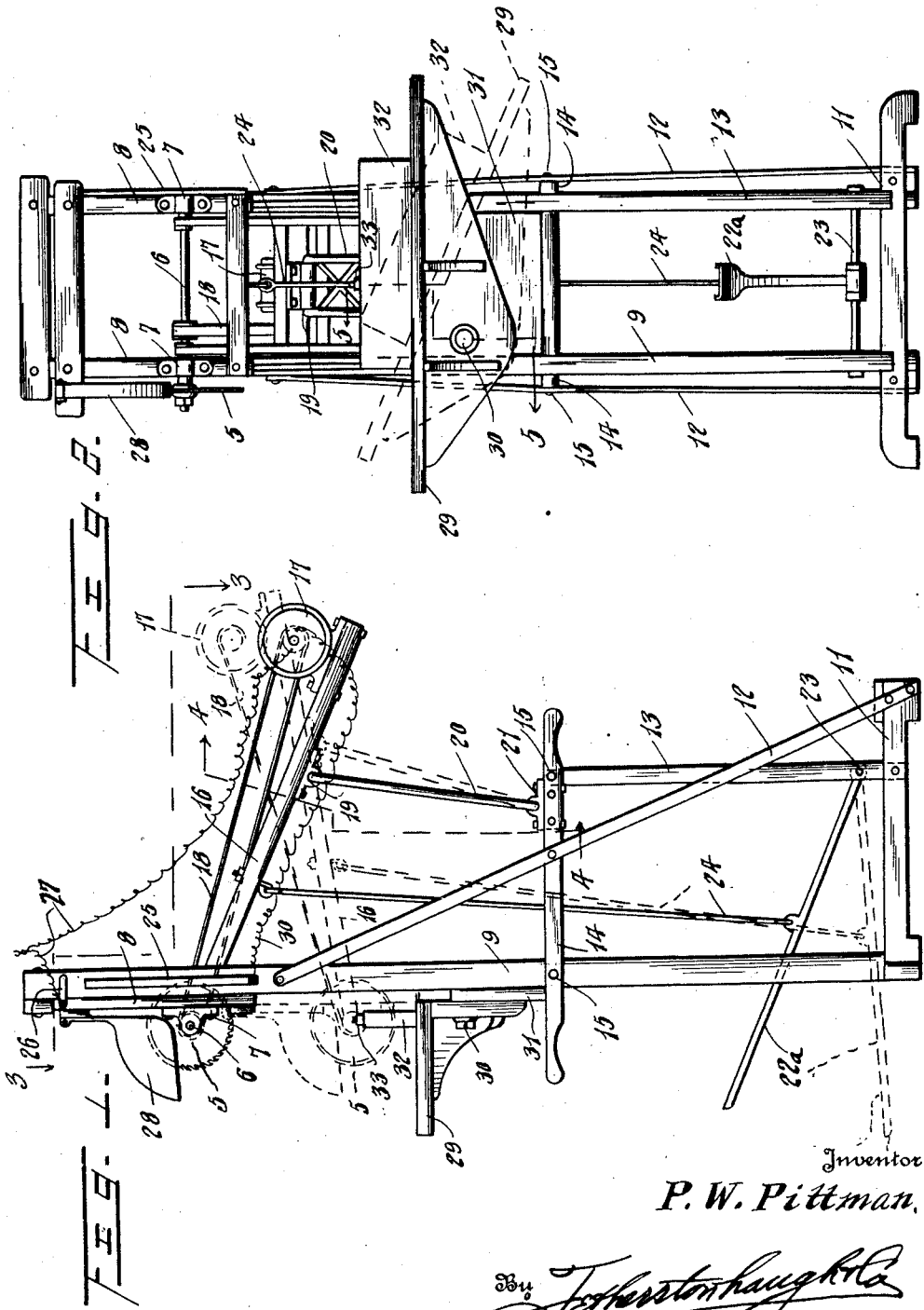

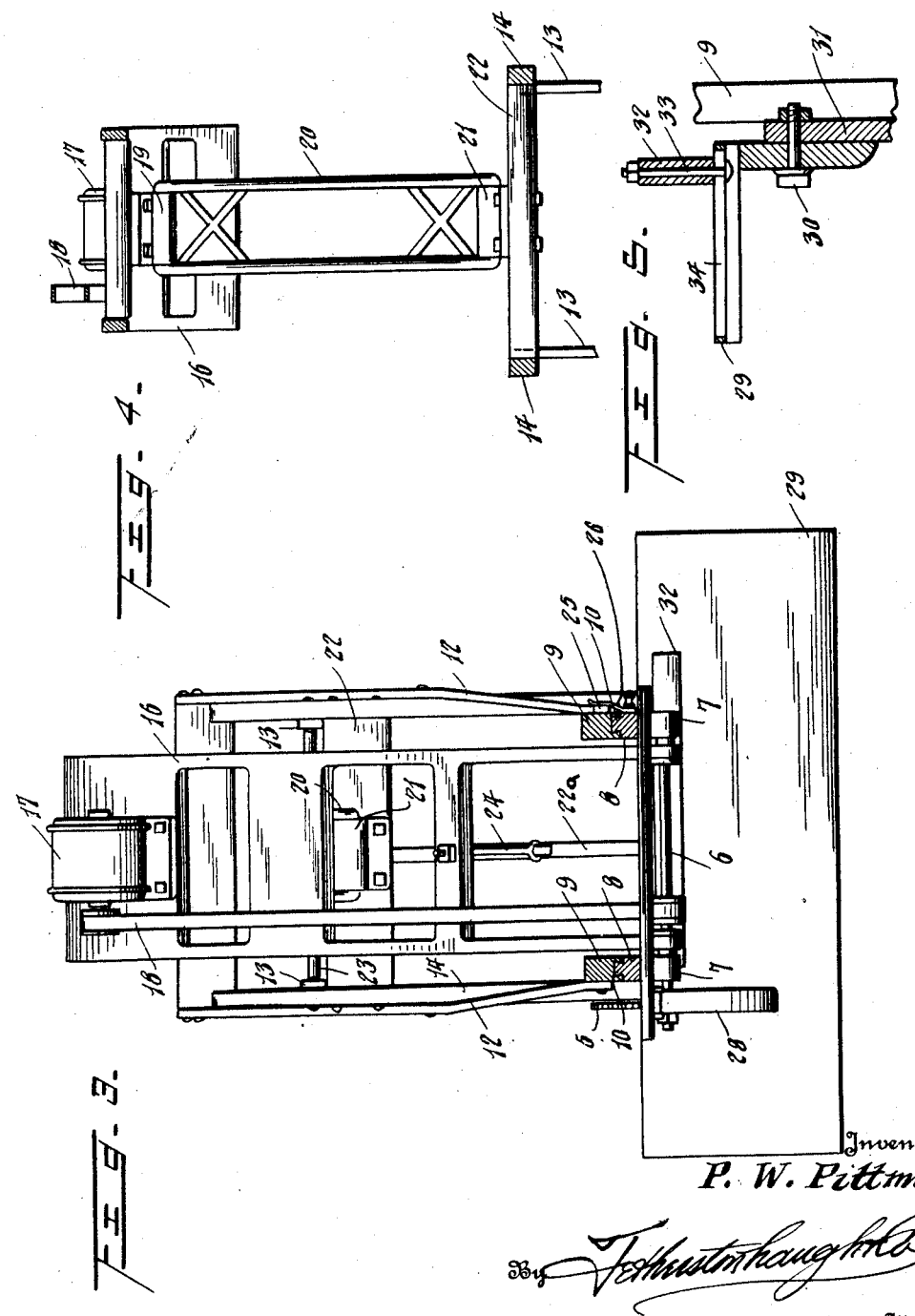

1,735,178

UNITED STATES PATENT OFFICE

PHILIP WARD PITTMAN, OF DURANGO, COLORADO

SAWING MACHINE

Application filed February 26, 1927. Serial No. 171,186.

This invention relates to improvements in portable sawing machines of the power driven type.

An object of the invention is to enable operation and positioning of the saw to be controlled without use of the hands, thereby economizing the time of the operator and facilitating the output of a greater quantity and variety of work than has been possible heretofore with machines of this class.

A further object is to provide a prime mover functioning to drive the saw and arranged to serve as a counterbalance for normally maintaining the saw in a retracted position with reference to the work.

A still further object of the invention is to prevent wastage of power during idle periods of the saw through the provision of means functioning to start and to stop operation of the prime mover as the saw is shifted to and from the work.

Other objects, advantages and characteristic features of the invention will be apparent from the following detailed description and accompanying drawings wherein I have disclosed what I now consider to be the preferred embodiment of the principles involved.

In the drawing:

Figure 1 is a view in side elevation of a sawing machine constructed in accordance with my invention.

Figure 2 is a view in front elevation.

Figure 3 is a sectional view taken along the line 3—3 of Figure 1.

Figure 4 is a sectional view taken along the line 4—4 of Figure 1.

Figure 5 is a sectional view taken along the line 5—5 of Figure 2.

Proceeding now to a detailed discussion of the drawings, 5 designates a circular saw fixed to one end of a shaft 6 which is journaled in bearings 7 on the saw carriage 8. The latter is secured to slide vertically on a pair of uprights 9 through the medium of tongue and groove connections 10, shown to advantage in Figure 3. These uprights form part of a supporting structure including a base frame 11, inclined brace bars 12 connected between the uprights and the base frame, standards 13 extending upwardly from the base frame rearwardly of the uprights 9 and horizontal handle members 14 bolted, as indicated at 15 to said uprights and rear standards. The handles 14 serve as a convenient means for shifting the supporting structure to different positions as required.

Positioning of the saw with reference to the work is controlled by the provision of a rocking beam 16 fastened at one end to the saw shaft 6 and supporting on the opposite end thereof a prime mover in the form of an electric motor 17 serving to drive the saw shaft through the medium of the drive belt 18. Between the saw and the motor, the beam 16 is pivotally supported, as at 19, on the upper end of a rocking link 20 having its lower end pivotally mounted in suitable bearing means 21 carried by a cross piece 22 extending between and secured to the handles 14. With this arrangement of parts it will be observed that the weight of the motor normally serves to depress the rear end of the beam 16 and to thereby hold the forward end of the beam and the saw carriage 8 in the elevated position shown by full lines in Figure 1. Downward movement of the saw carriage to a working position is effected through the medium of a foot pedal 22ª pivoted to a supporting rod 23 carried by the rear standards 13 and connected, by a link rod 24, to the beam 16 at a point between the saw 5 and the rocking link 20. Depression of this pedal serves to lower the forward end of the beam and the saw carriage in opposition to the weight of the motor 17. When the pedal is released the motor functions as a counterbalance to automatically elevate the saw carriage to a retracted or non-working position.

In order to prevent wastage of power I provide an automatic switch functioning to start and stop operation of the prime mover or motor 17 as the saw 5 is shifted to and from working position. This switch consists of a stationary contact strip 25 secured to the outer side of one of the uprights 9 and cooperating with a movable contact 26 fastened to the saw carriage 8 and adapted to engage the stationary contact during downward movement of the saw carriage and to be disengaged with the stationary contact when the saw carriage is elevated to the non-working position shown in Figure 1. These contacts are suitably connected to the motor and to a source of current supply through leads 27.

Preferably, a suitable form of saw guard 28 is hinged to the saw carriage to overlie the upward forward portion of the saw as indicated in Figures 1 and 2.

The work to be operated on by the saw is placed on a work table 29 which is pivotally attached, by a bolt 30, to a cross piece 31 carried by the uprights 9. By adjusting this table to various positions of angular inclination it will be apparent to those skilled in the art that a variety of operations may be performed. Mounted on the table is a suitable gauge plate 32 adapted to be secured in various adjusted positions through the medium of a bolt 33 carried by the gauge plate and operating in a slot 34 formed in the table as shown to advantage in Figure 5.

From the foregoing it is apparent that I have provided a very simple type of power driven sawing machine in which shifting of the saw toward the work is accomplished through the medium of the foot pedal 22$^a$ thereby leaving the hands of the operator free, at all times, for proper manipulation of the work. When the foot pedal is released on completion of a sawing operation the motor 17 functions as a counter-balance to automatically swing the beam 16 about the upper end of the rocking link 20 to thereby raise the saw carriage 8 and the saw 5 to an elevated or non-working position. During this elevation of the saw carriage the movable contact 26 of the automatic switch is disengaged with the stationary contact 25 thereby shutting off the current to the motor and stopping operation of the saw until the saw carriage is again lowered by the foot pedal 22$^a$ to reengage said contacts.

Having thus fully described what I now consider to be the preferred embodiment of the invention it will be understood that various modifications may be resorted to within the scope of the appended claims.

What I claim is:

1. The combination of a supporting structure, a saw carriage mounted to slide vertically thereon, a shaft rotatably journalled in bearings on the saw carriage, a circular saw fixed to said shaft, a beam intermediately pivoted to the supporting structure and secured at one end to the saw carriage, an electric motor mounted on the other end of the beam and serving as a counterbalance to normally hold the first mentioned end of the beam and the saw carriage in an elevated position, a drive connection between the motor and the said shaft, and foot pedal means for lowering the saw carriage against the weight of said motor.

2. The combination of a pair of uprights, a saw carriage slidably mounted on said uprights, a saw mounted on said carriage, a motor for driving said saw and a motor control switch including a stationary contact strip attached to one of said uprights and a movable contact attached to said saw carriage, said contacts being arranged to be engaged when the carriage is moved downwardly to advance the saw to the work and to be disengaged when the carriage is moved upwardly to dispose the saw in a non-working position and means for effecting movement of said carriage.

3. The combination of a frame presenting a pair of uprights, a vertically movable saw carriage slidably mounted on said uprights, a rocking link having its lower end pivoted to said frame, a lever intermediately pivoted to the upper end of said rocking link, one extremity of said lever being pivotally secured to said saw carriage, means for normally holding the saw carriage in an elevated position and means connected to said lever and operable to effect downward movement of the saw carriage.

4. The combination of a frame presenting a pair of uprights, a vertically movable saw carriage slidably mounted on said uprights, a saw and operating means therefor mounted on said carriage, a rocking link having its lower end pivoted to said frame, a lever intermediately pivoted to the upper end of said link, one extremity of said lever being pivotally secured to said saw carriage, a counterbalance mounted on the remaining end of the lever and normally serving to maintain the saw carriage in an elevated position and a foot pedal connected to the lever between the rocking link and the saw carriage and operable to move the saw carriage downwardly against the resistance of the counterbalance.

5. The combination of a frame presenting a pair of uprights, a vertically movable saw carriage slidably mounted on said uprights, a rocking link having its lower end pivoted to said frame, a lever intermediately pivoted to the upper end of said link, one extremity of said lever being pivotally secured to the saw carriage, a motor mounted on the remaining end of the lever and serving as a counterbalance to normally hold the first-mentioned end of the lever and the saw carriage in an elevated position, a shaft rotatably journalled in bearings on the saw carriage, a circular saw fixed to said carriage, a drive connection between the motor and said shaft and means operable to lower the saw carriage against the resistance offered by the weight of said motor.

In testimony whereof I hereunto affix my signature.

PHILIP WARD PITTMAN.